United States Patent
Emori et al.

(10) Patent No.: US 7,206,123 B2
(45) Date of Patent: Apr. 17, 2007

(54) RAMAN AMPLIFIER, PUMP SOURCE FOR USE IN A RAMAN AMPLIFIER AND METHOD FOR AMPLIFYING AN OPTICAL SIGNAL

(75) Inventors: Yoshihiro Emori, Chiyoda-Ku (JP); Jake Bromage, Rochester, NY (US); Lynn E. Nelson, Somerset, NJ (US); Shu Namiki, Chiyoda-Ku (JP)

(73) Assignee: The Furukawa Electric Co. Ltd., Tokyo (JP)

( * ) Notice: Subject to any disclaimer, the term of this patent is extended or adjusted under 35 U.S.C. 154(b) by 58 days.

(21) Appl. No.: 10/935,286

(22) Filed: Sep. 8, 2004

(65) Prior Publication Data

US 2005/0105165 A1    May 19, 2005

Related U.S. Application Data

(60) Provisional application No. 60/500,682, filed on Sep. 8, 2003.

(51) Int. Cl.
*H01S 4/00* (2006.01)
*H04B 10/12* (2006.01)

(52) U.S. Cl. .................................... 359/334
(58) Field of Classification Search ................ 359/334
See application file for complete search history.

(56) References Cited

U.S. PATENT DOCUMENTS 4,616,898 A    10/1986 Hicks, Jr.
4,699,452 A    10/1987 Mollenauer et al.

(Continued)

FOREIGN PATENT DOCUMENTS

EP    1 411 601    4/2004

(Continued)

OTHER PUBLICATIONS

Agrawal, G. P. , "Fiber Optic Communication Systems", Wiley, New York (2002), pp. 59-63.*

(Continued)

*Primary Examiner*—Jack Keith
*Assistant Examiner*—Eric Bolda
(74) *Attorney, Agent, or Firm*—Oblon, Spivak, McClelland, Maier & Neustadt, P.C.

(57) ABSTRACT

A method, pump and Raman amplifier control an amount of stimulated Brillouin scattering (SBS) produced by the Raman amplifier pump so as to regulate a power penalty experienced by a receiver due to the SBS. A multi-mode semiconductor laser produces a multi-mode pump light having a dominate mode at a predetermined wavelength. At least a portion of the multi-mode pump light is coupled to a Raman gain medium in a forward pumping direction. A reflection sensor monitors reflected light that is at least partially reflected from said Raman gain medium. The reflection sensor has a passband characteristic that passes optical power of a dominate SBS peak of said reflected light, but suppresses other SBS peaks that are offset in wavelength from said dominate SBS peak. The optical power of the dominate SBS peak is compared to an optical power of the multi-mode pump light, and it is determined whether a result of the comparing step is above a predetermined threshold.

22 Claims, 17 Drawing Sheets

U.S. PATENT DOCUMENTS

| | | | |
|---|---|---|---|
| 5,272,717 A * | 12/1993 | Stultz | 372/3 |
| 5,664,131 A | 9/1997 | Sugiya | |
| 5,673,280 A | 9/1997 | Grubb et al. | |
| 5,715,263 A | 2/1998 | Ventrudo et al. | |
| 5,887,093 A | 3/1999 | Hansen et al. | |
| 5,912,761 A | 6/1999 | Jander et al. | |
| 5,940,209 A | 8/1999 | Nguyen | |
| 5,995,275 A | 11/1999 | Sugaya | |
| 6,038,063 A | 3/2000 | Tsuda et al. | |
| 6,072,614 A * | 6/2000 | Roberts | 398/177 |
| 6,115,174 A | 9/2000 | Grubb et al. | |
| 6,151,160 A | 11/2000 | Ma et al. | |
| 6,178,038 B1 | 1/2001 | Taylor et al. | |
| 6,188,705 B1 | 2/2001 | Krainak et al. | |
| 6,229,631 B1 | 5/2001 | Sato et al. | |
| 6,246,510 B1 | 6/2001 | BuAbbud et al. | |
| 6,292,288 B1 | 9/2001 | Akasaka et al. | |
| 6,310,716 B1 | 10/2001 | Evans et al. | |
| 6,313,940 B1 | 11/2001 | Bode et al. | |
| 6,317,225 B1 | 11/2001 | Kim | |
| 6,320,884 B1 | 11/2001 | Kerfoot, III et al. | |
| 6,344,922 B1 | 2/2002 | Grubb et al. | |
| 6,417,959 B1 | 7/2002 | Bolshtyansky et al. | |
| 6,433,920 B1 | 8/2002 | Welch et al. | |
| 6,433,921 B1 | 8/2002 | Wu et al. | |
| 6,547,453 B1 * | 4/2003 | Stummer et al. | 385/88 |
| 6,674,567 B2 * | 1/2004 | Ohtani et al. | 359/334 |
| 6,819,412 B2 * | 11/2004 | Glingener et al. | 356/73.1 |
| 2001/0036004 A1 | 11/2001 | Ackerman et al. | |
| 2002/0093998 A1 | 7/2002 | Kimura et al. | |
| 2002/0118715 A1 | 8/2002 | Kimura et al. | |
| 2002/0149841 A1 * | 10/2002 | Ohtani et al. | 359/341.1 |
| 2003/0039025 A1 * | 2/2003 | Mugino et al. | 359/334 |
| 2003/0128728 A1 | 7/2003 | Shimizu et al. | |
| 2004/0057485 A1 | 3/2004 | Ohki et al. | |
| 2004/0080811 A1 | 4/2004 | Shimizu et al. | |
| 2005/0057794 A1 * | 3/2005 | Ohtani et al. | 359/334 |

FOREIGN PATENT DOCUMENTS

| | | |
|---|---|---|
| WO | WO 01/51986 | 7/2001 |

OTHER PUBLICATIONS

Elizabeth Bruce, Tunable Lasers, IEEE Spectrum, Feb. 2002, pp. 35-39.

Emori, Y. and Namiki, S. "100 nm bandwidth flat gain Raman amplifiers pumped and gain-equalized by 12-wavelength-channel WDM high power laser diodes." OFC/IOOC 1999, Technical Digest. PD 19/1-19/3, Feb. 1999.

B. Zhu, et al., "6.4-Tb/s (160×42.7 Gb/s) transmission with 0.8 bit/s/Hz spectral efficiency over 32×100 km of fiber using CSRZ-DPSK format", OFC2003, paper PD19, 2003, pp. (PD19-1)-(PD19-3).

J. Bromage, et al., "High co-directional Raman gain for 200-km spans, enabling 40×10.66 Gb/s transmission over 2400 km", OFC2003, paper PD24, 2003, pp. (PD24-1)-(PD24-3).

R. P. Espindola, et al., "High power, low RIN, spectrally-broadened 14xx DFB pump for application in co-pumped Raman amplification", Proc. European Conference on Optical Communication, vol. 6, paper PD.F.1.7., 2001, pp. 36-37.

Soko Kado, et al., "Broadband flat-noise Raman amplifier using low-noise bi-directionally pumping sources", Proc. European Conference on Optical Communication, vol. 6, paper PD.F.1.8., 2001, pp. 38-39.

Y. Ohki, et al., "Increase of Relative Intensity Noise after Fiber Transmission in Co-propagating Raman Pump Lasers", OAA2002, paper PD7, 2002, pp. (PD7-1)-(PD7-3).

Yujun Qian, et al., "Gain limitation due to pump stimulated Brillouin scattering in various fibers", OAA2003, paper MD29, 2003, pp. 148-150.

N. Tsukiji, et al., "Advantage of Inner-Grating-Multi-mode Laser (iGM-laser) for SBS Reduction in co-propagating Raman amplifier", OAA2002, paper OMB 7, 2002, pp. 12-14.

* cited by examiner

RAMAN AMPLIFIER, PUMP SOURCE FOR USE IN A RAMAN AMPLIFIER AND METHOD FOR AMPLIFYING AN OPTICAL SIGNAL

CROSS-REFERENCE TO RELATED PATENT APPLICATIONS

The present application claims the benefit of the earlier filing date of U.S. Provisional Patent Application Ser. No. 60/500,682, filed Sep. 8, 2003, the entire contents of which being incorporated herein by reference.

BACKGROUND OF THE INVENTION

1. Field of the Invention

The present invention relates to a Raman amplifier, optical pump for use in a Raman amplifier, and a method for amplifying optical signals in various optical media. More particularly the invention relates to a Raman amplifier, pump and method that employs a pump for a Raman amplifier to identify an acceptable range of stimulated Brillouin scattering (SBS) generated in the amplifier fiber that causes no more than a predetermined amount of relative-intensity-noise (RIN) deemed acceptable for system performance requirements.

2. Discussion of the Background

Much of the technical background and motivation for using Raman amplifiers and optical systems is described in U.S. Pat. No. 6,292,288, the entire contents of which is incorporated herein by reference.

From a system-level perspective, it is desirable to provide a high bit rate system for low cost. However, to support high bit rate systems, a higher signal to noise (SNR) is required at the receiver to provide an adequate bit error rate (BER). With regard to the SNR, the signal level may be increased by increasing the input power from the signal source. However, the benefit of increasing the signal power beyond a predetermined amount can be wasted (i.e., a power penalty) due to the non-linear effect of the optical fiber itself. In other words, for a given BER, the power penalty is the extra optical power required to produce the same BER than if there was no noise or interference added by the non-linear effect. Thus increasing the amount of signal power in an optical transmission is only one aspect to the overall system analysis for obtaining the maximum performance.

To help resolve the limitation of the non-linear effect, fiber Raman amplifiers have become useful. A Raman amplifier is beneficial from a systems perspective because it reduces the cost for regenerative repeaters by increasing the span for which repeaters are required. Increasing the span between repeaters reduces the overall number of repeaters in a system, thus lowering cost and increasing the system's mean-time-between failure.

Conventionally, backward pumped Raman amplifiers have commonly been used, where the propagation direction of the pump light is opposite the propagation direction of the signal light. In this way, variations in the pump light, do not prejudicially over amplify, or under amplify specific portions of the signal, thereby providing a relatively non-prejudicial gain to the envelope of the signal.

Forward pumped Raman amplifiers are also known to have some merit, vis-à-vis backward pumped amplifiers, such as to suppress deterioration due to non-linear effects and ASE noise. However, the industry has generally failed to adopt forward pumped Raman amplifiers because of several problems. First, additional noise is present due to the transfer of pump relative intensity noise (RIN) to the signal light. Unlike with backward pumping, in a forward pumped Raman amplifier variations of the pump intensity are transferred to the signal light. In order to combat this problem, low RIN lasers were developed. However, low RIN pump lasers were later found to cause a new problem of causing stimulated Brillouin scattering (SBS) of pump light when used in a Raman amplifier system. Consequently, pump RIN degrades (i.e., the amount of noise is increased) in the fiber when the pump causes SBS. As the pump RIN becomes larger, the amplified signal has more noise contained therein due to pump-to-signal RIN transfer, thereby degrading system performance. Furthermore, the presence of SBS especially at large levels means that some of the pump power is lost wasted, which leads to lower amplifier efficiency.

According to these limitations with forward pump systems, conventional design philosophy dictates that no pump SBS can be tolerated for use in an optical communication system. The conventional method for using a forward pumped system is to ensure that no pump SBS exists by confirming that the pump reflection power generally corresponds with the Rayleigh scattered power of the pump light launched into the amplifier fiber. Moreover, the Rayleigh scattered pump power level is present regardless of the existence of SBS.

Since both SBS and Rayleigh scattering are components of pump reflected power, if the pump reflected power is generally set to correspond with the Rayleigh scattering level, then the amount of SBS is effectively nothing.

Low RIN pump laser diodes typically have a narrower longitudinal mode spectral line width, which in turn causes larger SBS in the fiber than conventional broader line width pump LDs. Once again, because the conventional design practice is to set to zero SBS, low RIN pump LDs are not able to be used at their full power capacity, thus making low RIN LDs less effective than if SBS was deemed not to be a problem at all.

In the past, Ohki et al., "Increase of relative intensity noise after fiber transmission in co-propagating Raman pump lasers," OAA2002, Paper PD7, did show pump RIN, after passing through the fiber amplifier, increasing due to SBS, but nevertheless a quantitative relationship between RIN increase and pump SBS was not identified.

After recognizing the linkage between low RIN and SBS, the present inventors recognized that the system analysis for a conventional forward pumped Raman amplifier (or co-pumped Raman amplifiers) may permit some amount of SBS provided that a better relationship was understood between SBS, RIN and system performance. Moreover, the present inventors recognized that by not appreciating the source of the exact relationship between RIN and SBS, it would not be possible to select pump LDs for a forward pumped or co-pump Raman amplifier and still provide maximum system performance, or make full use of the LD's pump power capacity.

A conventional technique for measuring SBS is shown in FIG. 1. A pump 2 provides optical pumping power to a fiber 9 by way of a monitor/coupler 8. The coupler 8 may, for example, 1% coupling so as to provide some predetermined amount of pump power (e.g., 1%) to an optical power meter 6, which serves as an input monitor. Power reflectivity is then monitored by a reflection monitor, which may be an optical power meter and/or an optical spectrum analyzer 4. The reflective power passes through the monitor/coupler 8 and is provided to the optical power meter or optical spectrum analyzer 4. It is possible to separate SBS, which is present at 0.1 nm on the longer side of each Rayleigh backscattering peak, from the reflected light, if an optical spectrum analyzer 4 could be used. As previously discussed, according to conventional practice, no pump SBS is tolerated, and to ensure no pump SBS exists, the conventional monitoring technique confirms that the pump reflection power is set to generally the same level as the Rayleigh scattered power.

Consistent with the selection of detection of SBS, is the use of power penalty for selecting acceptable LDs for use in a system. Typically, a power penalty specification is set and an associated power reflection ratio (PRR), which is a ratio of total reflected power to total input power, is used as a criteria for selecting suitable LDs. Since the relation between power penalty and PRR has not yet been shown, only the LD modules that provide acceptably low PRR (e.g., as low as that caused by Rayleigh backscattering) has been selected. Since LD modules are expensive, the cost of each "acceptable" part increases as the manufacturing yield decreases. Likewise, more LDs are deemed unacceptable when they produce a higher PRR than the selection criteria.

SUMMARY OF THE INVENTION

One object of the present invention is to more accurately determine whether the conventional design approach for providing no SBS in a co-pumped (or forward pumped) Raman system, is a sound criteria by which to configure such a system.

Another object of the present invention is to address the limitations of conventional approaches for monitoring the amount of SBS in a co-pumped (or forward pumped) Raman amplifier system so that a broader range of optical pumps may be selected for use in the system. Furthermore, system performance may be enhanced by selecting the appropriate levels of SBS while not degrading system performance.

These objects, as well as other deficiencies in conventional methods and systems, are addressed by the present invention. A feature of the present invention is to provide a new method for measuring pump SBS (both in-situ and during component screening during manufacturing) for a multi-mode pump laser, and in turn interpreting the results to identify an acceptable range of pump SBS. Accurately measuring the amount of SBS enables the use of LDs having some tolerable amount of pump SBS for use in optical communication systems.

Moreover, a method, pump and Raman amplifier according to the present invention control an amount of stimulated Brillouin scattering (SBS) produced by the Raman amplifier pump so as to regulate a power penalty experienced by a receiver due to the SBS. A multi-mode semiconductor laser produces a multi-mode pump light having a dominant mode at a predetermined wavelength. At least a portion of the multi-mode pump light is coupled to a Raman gain medium in a forward pumping direction. A reflection sensor monitors reflected light that is at least partially reflected from said Raman gain medium. The reflection sensor has a passband characteristic that passes optical power of a dominant SBS peak of said reflected light, but suppresses other SBS peaks that are offset in wavelength from said dominant SBS peak. The optical power of the dominant SBS peak is compared to an optical power of the multi-mode pump light, and it is determined whether a result of the comparing step is above a predetermined threshold.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
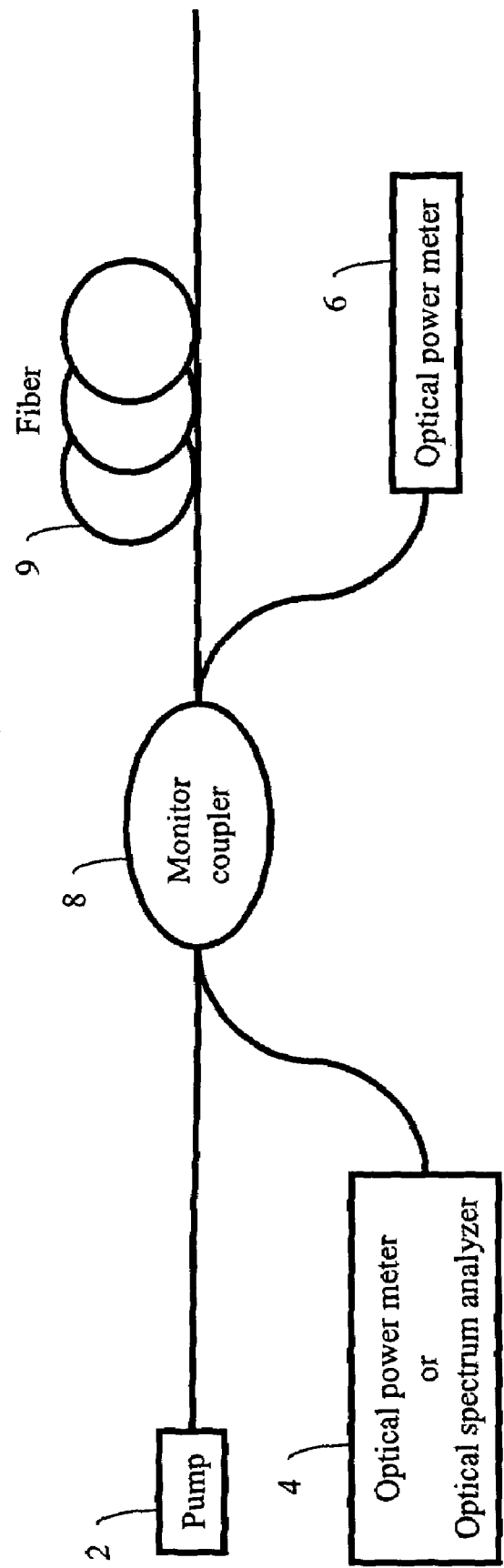
FIG. 1 is a block diagram of a conventional measurement system for measuring SBS in a forward-pumped Raman amplifier.
Figure 2:
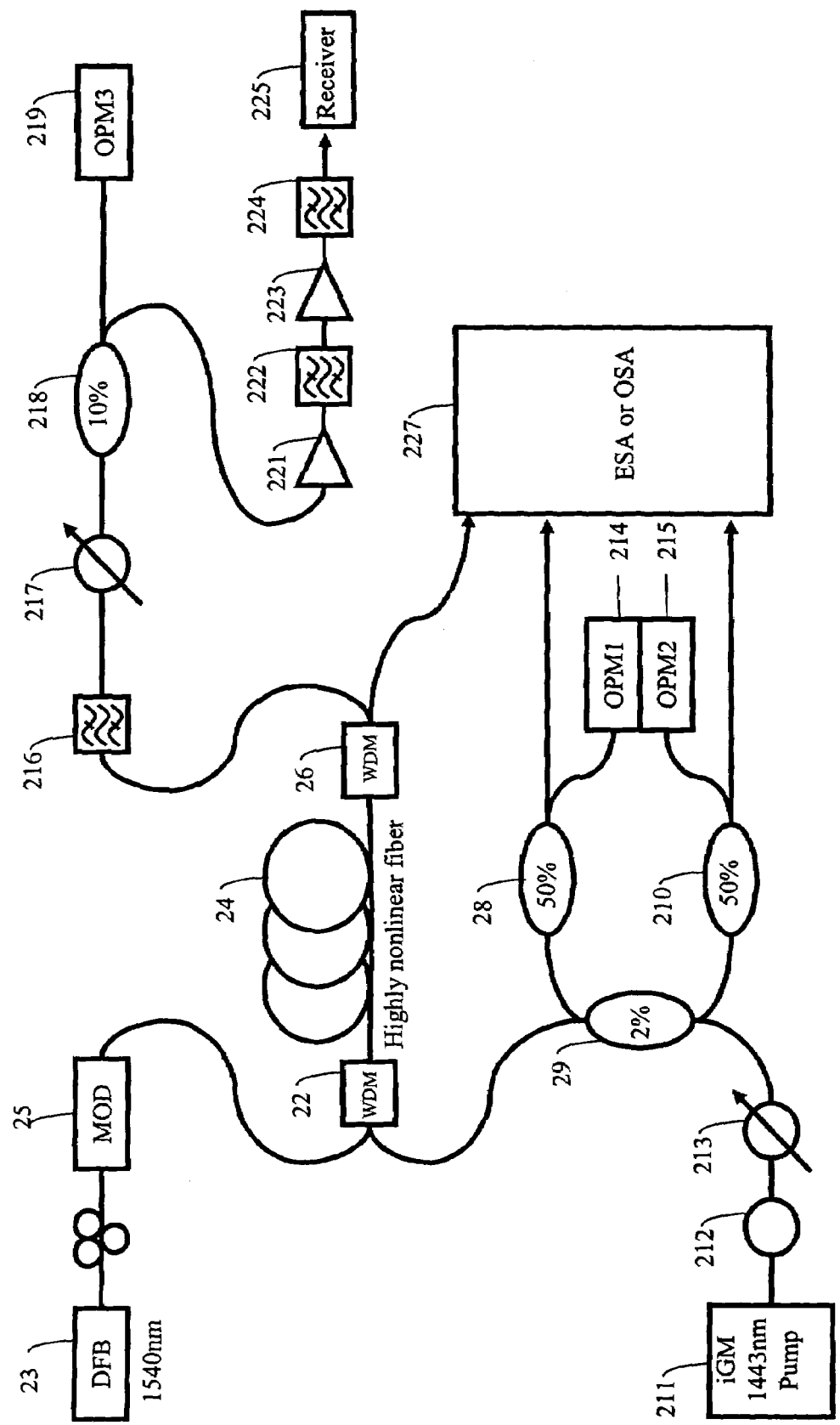
FIG. 2 is a block diagram of a measurement system according to the present invention.

Referring now to the drawings, FIG. 2 illustrates a block diagram of a measurement setup that may be used according to the present invention for selecting suitable pumps and accurately determining SBS levels. A pump source 211 is a 1443 nm iGM (inner-grating stabilized multimode pump laser) such as that described in U.S. Pat. No. 6,614,823 entitled "Semiconductor Laser Device Having a Diffraction Grating on a Light Reflection Side", the entire contents of which being incorporated herein by reference. The iGM laser is a low RIN pump laser with a built-in isolator. The output of the pump 211 is provided to an external depolarizer 212 made of 10 meters of polarization maintaining fiber. The output of the external depolarizer 212 is provided to a variable optical attenuator 213 that is used for changing (manually or under computer control) an input power to the amplifier fiber 24 (which in this case is a highly non-linear fiber) under constant pump output power so as to keep the same operating conditions of the pump laser (e.g., laser current and temperature).

An optical signal is provided at 1540 nm from a distributed feedback laser 23. This signal is then passed through an optional polarization controller (shown as three rings, which is optional if the output fiber is a polarization maintaining fiber). The output is then provided to a modulator 25 which in this case is a lithium niobate type modulator and thus is sensitive to input polarization. The signal provided from the DFB laser 23 has less than −150 dB/Hz of RIN, and is modulated by 10.7 Gb/s NRZ formatted data of a $2^{31}-1$ pseudorandom bit stream so as to provide a reliable data source for bit error rate measurements. The output of the modulator 24 is passed to the WDM coupler 22 which combines the signal light with the pump light. The output of the WDM coupler 22 is passed through the fiber 24 and then output by way of another WDM coupler 26. The highly non-linear fiber 24 is about 3.7 kilometers in length and has 0.8 dB/kin of loss and 1.83 ps/nm/km of dispersion at 1550 nm. Its zero-dispersion wavelength is shorter than 1400 nm.

A portion of the light from the WDM coupler 26 is provided to an electro-optic or optical spectrum analyzer 227, and the remaining portion is provided to a bandpass filter 216, variable optical attenuator 217 and a 10% coupler 218. The bandpass filter 216, centered about the signal wavelength, has a bandwidth (e.g., 0.56 nm) sufficient to cover the modulated signal bandwidth that contains that contains the full spectral energy of the signal, but still excludes noise from the detection bandwidth. The output of filter 216 is scaled by the variable optical attenuator 217, which is included to reduce the sensitivity of the system. By reducing the input power to the pre-amplifier makes the optical SNR after the amplifier worse. This way BER vs. optical SNR can be measured. Moreover, this configuration allows for the identification of the optical SNR that gives a predetermined BER, which can be used as the standard for the receiver sensitivity. If the signal contains extra noise, a better optical SNR (or larger power) will be required to obtain the same BER. This increase in power is the power penalty. Once again, the attenuator 217 is used to identify how much power is required to obtain the predetermined BER.

After the attenuator 217, the output power is measured by the optical power meter 3 (element 219) after passing through a 10% coupler 218. 10% of the light from the coupler 218 is provided to an optical power meter 3 shown as element 219. The remaining 90% of the power is provided through a first stage amplifier 221 followed by bandpass filter 222 and then to a second stage amplifier 223 followed by a bandpass filter 224 before being received by a receiver 225. Not shown, is a bit error rate unit coupled to the receiver 225, for monitoring the bit error rate of the input signal. The first stage filter 222 is a 1.24 nm Fabry Perot filter which suppresses broadband noise provided by the amplifier 221. Similarly, the filter 224 suppresses the noise and spurious output of the second stage amplifier 223 prior to detection in the receiver 225. An output of the receiver 225 is connected to a BER measurement unit that detects the bit errors as compared with the data stream produced by the modulator 25.

The launched and reflected pump powers are monitored by the power meters 214 and 215. The OSA 227 uses a resolution bandwidth (e.g., 0.01 nm) that is able to isolate the Rayleigh scattering peaks from the SBS peaks. Likewise, the detection bandwidth is sufficiently small to allow the OSA 227 to observe the total power of the dominant SBS peaks without being contaminated by adjacent energy from Rayleigh scattering or other SBS peaks. Moreover, this configuration allows for the measurement of "features" in the reflected power, which in turn enables the an alternative measurement of PRR, as will be discussed. Isolating the energy in SBS peaks is a valuable measurement because RIN increases due to SBS is the dominant cause of SNR deterioration. It should also be noted that RIN increases due to mode partition is expected to be suppressed because of the small dispersion at the pump wavelength and the short length of the fiber.

Also shown in FIG. 2 is a 2% monitor coupler 29 which provides 2% of the input power for analysis through a monitor/coupler 28 for observation by both an optical power meter 1 (element 214) and an optical spectrum analyzer 227. Likewise, the reflected power from the highly non-linear filter 24 is provided by way of the optical couplers 29 and 210 for observation on an optical power monitor 2 (element 215) and an optical spectral analyzer 227.

Figure 3:
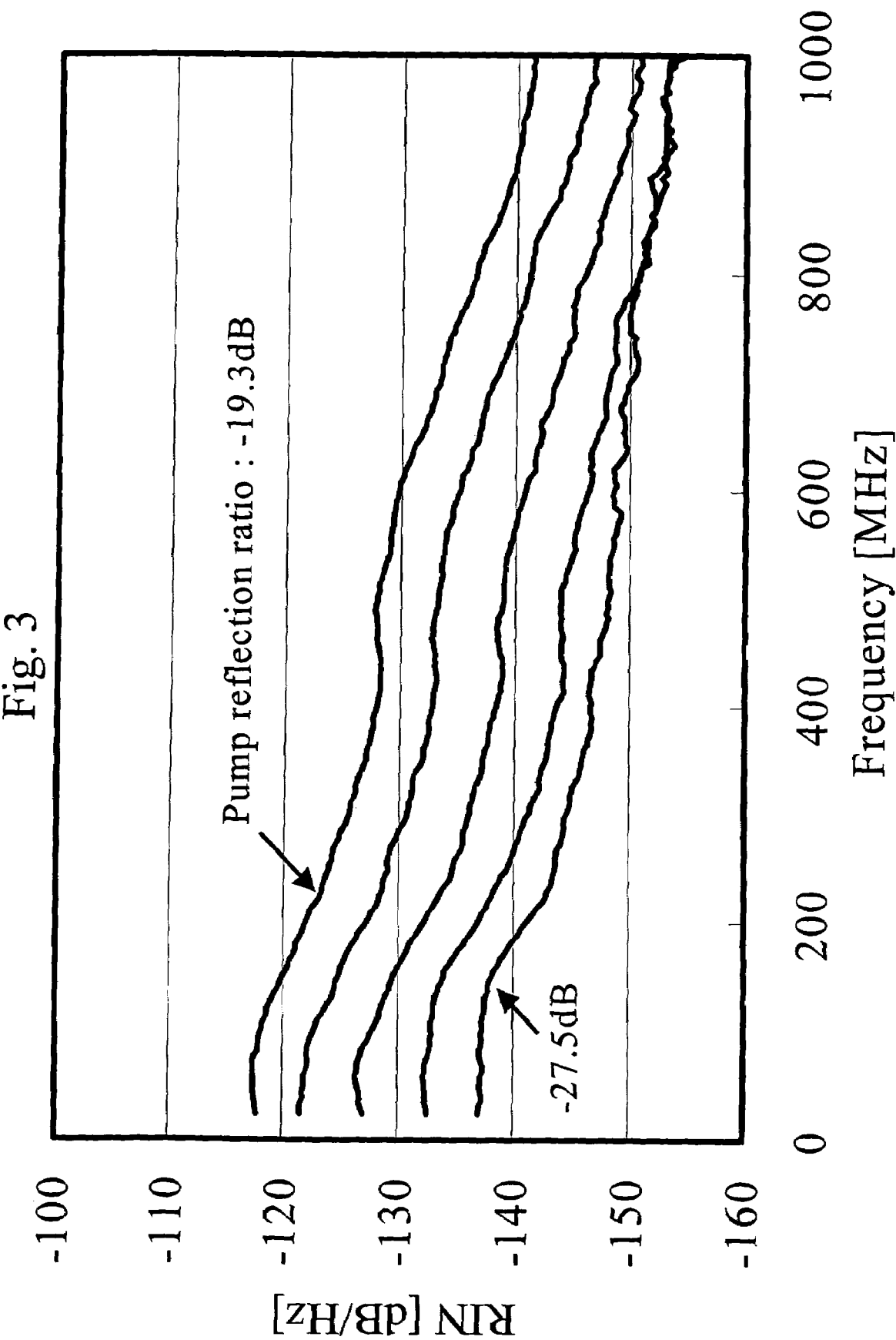
FIG. 3 is a graph showing RIN versus frequency, for different pump reflection ratios.

FIG. 3 is a graph showing pump RIN spectra (RIN in dB/Hz) as a function of frequency (MHz). This RIN spectra is measured after passing pump light through the amplifier fiber with between −19.3 dB to −27.5 dB (roughly 2 dB increments) of pump reflection ratio. These measurement results are significant as others have not previously assessed or identified the quantitative relation between an RIN increase and pump SBS. Referring to the block diagram of FIG. 2, the variable optical attenuator 213 was varied in 2 dB increments in order to change the level of SBS. Then, the spectrum was captured with the optical spectrum analyzer 227. As can be seen, since the −3 dB corner frequency of pump-to-signal RIN transfer function of this measurement setup is located at less than 1 GHz, only this frequency range is focused on in this particular analysis. The RIN magnitude depends on the power reflection, but the spectrum pattern is essentially the same. What can be seen from FIG. 3, is that the level of RIN increases as the pump reflection ratio increases, where the increase in RIN is due to pump SBS.

Figure 4:
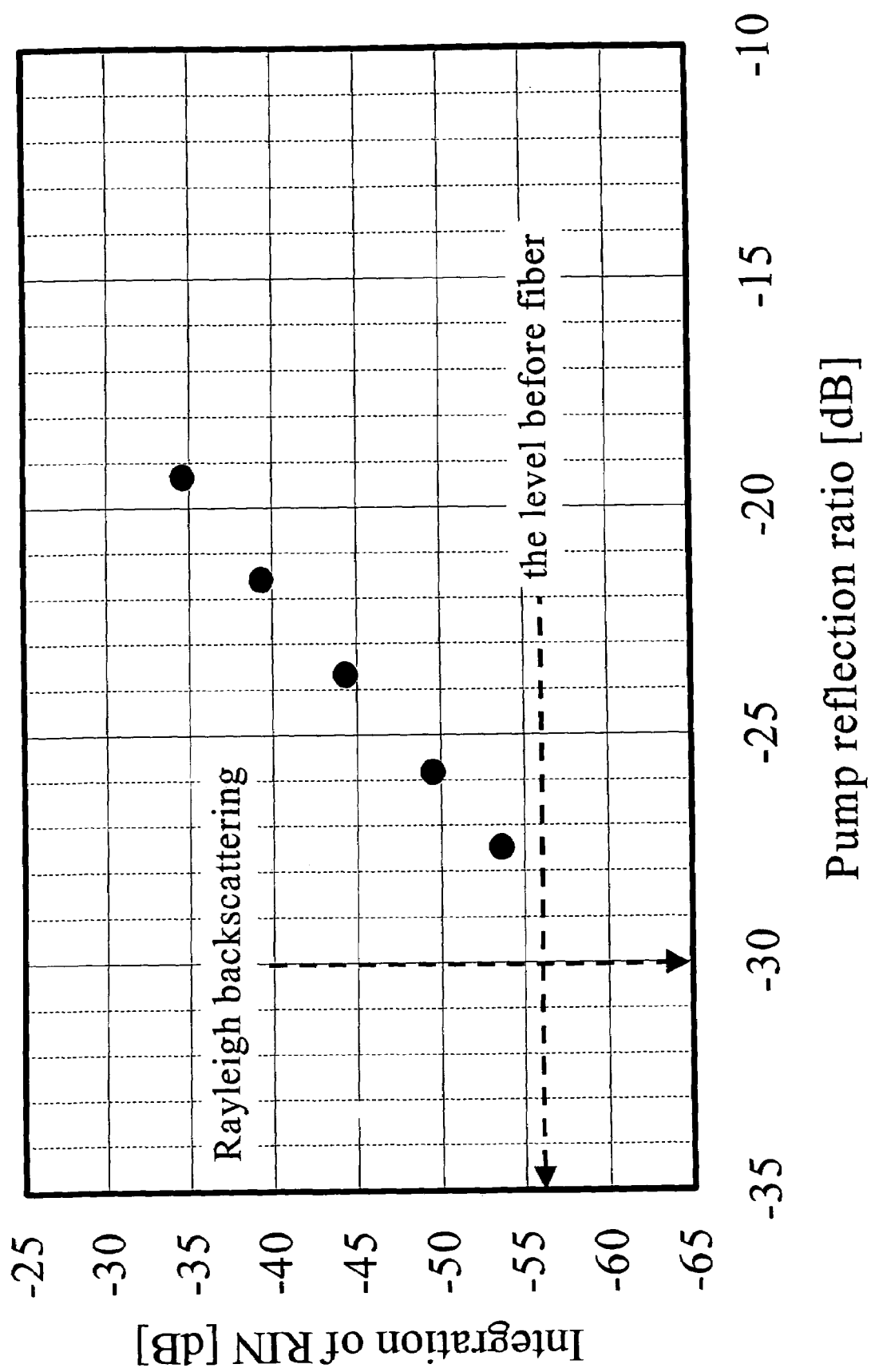
FIG. 4 is a graph showing integrated RIN versus pump reflection ratio, with a limit being the Rayleigh backscattering.

FIG. 4 is graph showing integrated RIN (dB) versus pump reflection ratio (PRR) in dB. The RIN was integrated so as to convert the spectrum data into an amount of noise power. Accordingly, for each pump RIN spectrum shown in FIG. 3, the area under each curve was integrated up to 1 GHz and plotted as a function of pump reflection ratio.

In the plot of FIG. 4, the RIN level before the fiber was measured to be −56 dB, which is a typical value for launched pump light. However, as can be seen, the amount of noise increases monotonically as the pump reflection ratio increases. A noise increase of about 20 dB is observed for a reflection ratio increase of about 8 dB, where this increase in noise power is attributed to SBS. The Rayleigh backscattering (about −30 dB) sets the limit for the minimum amount of pump reflection ratio that may be achieved.

Figure 5:
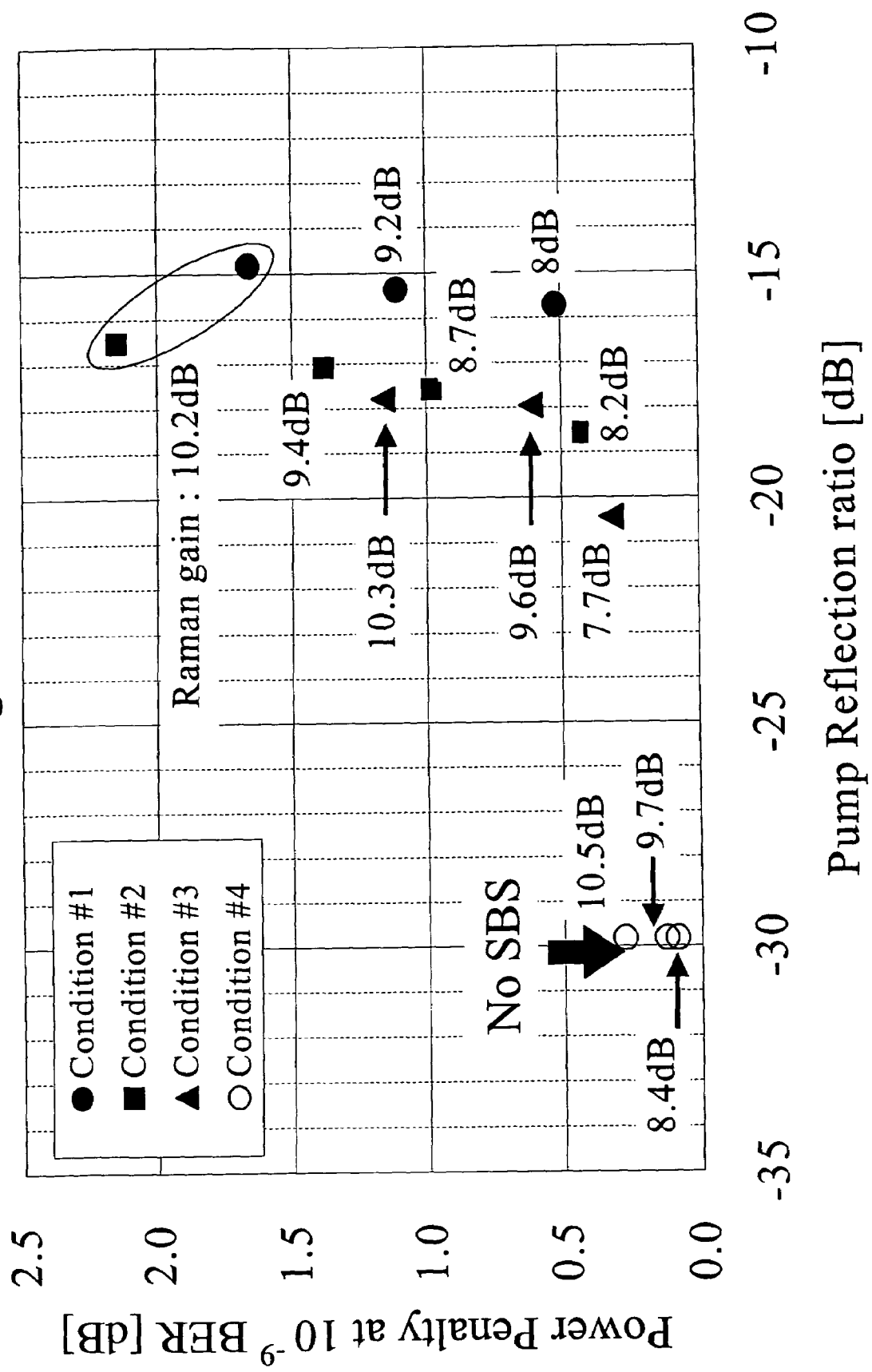
FIG. 5 is a graph showing power penalty at a predetermined bit error rate versus pump reflection ratio for different operating conditions.

FIG. 5 is a graph showing a "power penalty" that is observed at a $10^{-9}$ bit error rate as a function of different pump reflection ratios. Moreover, FIG. 5 shows four different conditions, where conditions 1–3 show differences between pump laser operating conditions (e.g., current and temperature variation) and a fourth condition where no SBS is observed (i.e., the reflected power consists of energy due only to Rayleigh backscattering).

In a forward pumped Raman amplifier, the pump RIN is partially transferred to the amplified signal. Therefore, larger pump RIN leads to the larger RIN in the amplified signal, and therefore a larger power penalty as experienced by the receiver. In this case, the power penalty is defined as the received power increase at $10^{-9}$ BER as compared to the case of no Raman gain at all. As can be seen, the power penalty generally increases as either SBS or Raman gain increases.

However, in observing this data using a conventional measurement metric (i.e., PRR), it was found that the power penalty for condition No. 1 is smaller than that for condition No. 2, at a 10.2 dB of Raman gain, despite the fact that the PRR for condition No. 1 was larger than that for condition No. 2 (see two circled data points in FIG. 5). This data is inconsistent with conventional theory because one would expect that for a larger pump reflection ratio for a fixed Raman gain, the power penalty should be greater, not less.

Based on these observations made by the present inventors, the present inventors were able to realize that a source of a problem of not achieving maximum system performance for a given LD lies in the revelation that the design approach for setting acceptable power penalty levels for Raman systems using the conventional metric of PRR is flawed.

Figure 6:
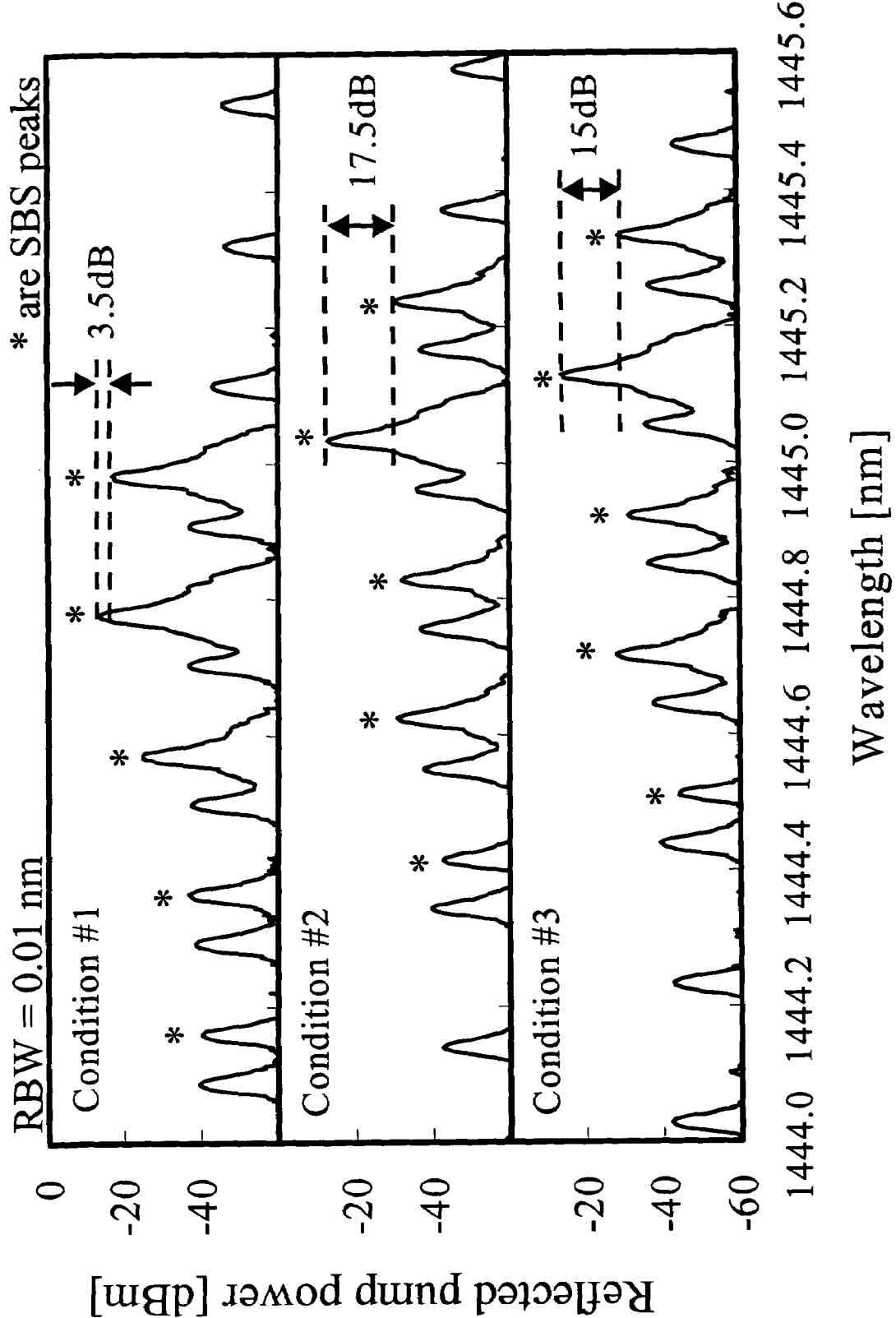
FIG. 6 includes a set of graphs for different pump conditions, showing reflected pump power versus wavelength.

FIG. 6 is a graph showing reflected pump power versus wavelength for the same three conditions. Moreover, the respective graphs show differences of the SBS spectra for conditions 1–3. In each case, the peak SBS power was the same for all three conditions. However, the side mode SBS power is different (i.e., the total SBS reflection power proved to be different). As can be seen from FIG. 6, a difference of 3.5 dB in peak-to-side mode peak power is 3.5 dB, while 17.5 and 15 dB are observed for conditions 2 and 3.

For each one of the graphs for the three different conditions, the resolution bandwidth was set to 0.01 nm and swept across the observed spectrum. In this way, the reflected pump power could be measured across the wavelength span shown in FIG. 6. Each spectrum revealed a characteristic dual peak "signature" for the different modes of the reflected pump power. For each pair of peaks (each peak being a "feature"), the rightmost peak (identified with an *) is the SBS peak, while the peak without the asterisk represents the Rayleigh scattering component (i.e., the peak wavelengths of the pumping light). Once again, FIG. 6 reveals the difference in operational condition between the peak SBS to side-mode peak, which could vary substantially between LD pump operating conditions.

Figure 7:
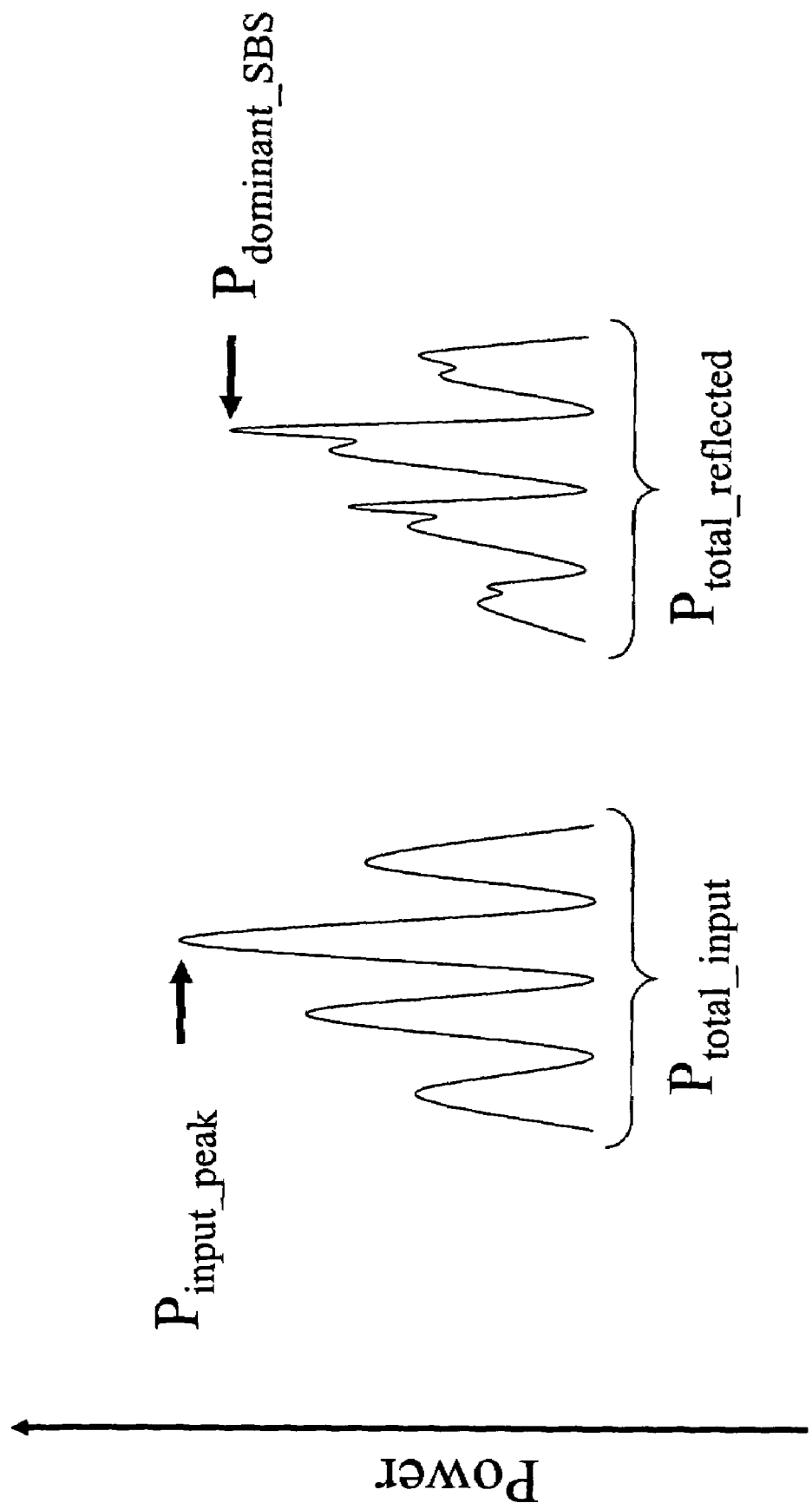
FIG. 7 is a graph showing a spectral relationship between peak input power spectrum and total reflected power where dominant SBS.

FIG. 7 shows the respective spectra for the total pump input power and total reflected power. The peak input power mode and peak dominant SBS feature are identified in the two spectra. Furthermore each of the different modes for the input spectrum are easily identifiable (four modes shown), where the total power in each mode is measured with an optical spectrum analyzer with an appropriate bandwidth set so that the total mode power is consistent with that observed by the detector. As can be seen in the spectra for the reflected power, the characteristic dual peaks are observed for the different modes, the left peak being due to Rayleigh backscattering and the rightmost peak being due to SBS.

In the conventional measure of PRR, PRR equals the ratio of total reflected power to the total input power. However, the present inventors recognized that this approach does not fully characterize the SBS-RIN phenomenon because it completely ignores the distribution of SBS power within the reflected spectrum. The present inventors address this omission by using feature detection of the reflected spectrum, which allows for the isolation and measurement of specific SBS features. Accordingly a new definition of weighted mode reflection ratio (WMRR) is now established to provide a more accurate way to characterize SBS and RIN. WMRR is equal to the peak input power/total input power times the dominant SBS power/input peak power. Rewritten, WMRR provides a ratio of dominant SBS power/total input power. In other words the numerator of WMRR is the total power of a dominant SBS mode which is measured by an optical spectrum analyzer in an appropriate bandwidth condition as the total mode power is received at a detector.

Figure 8:
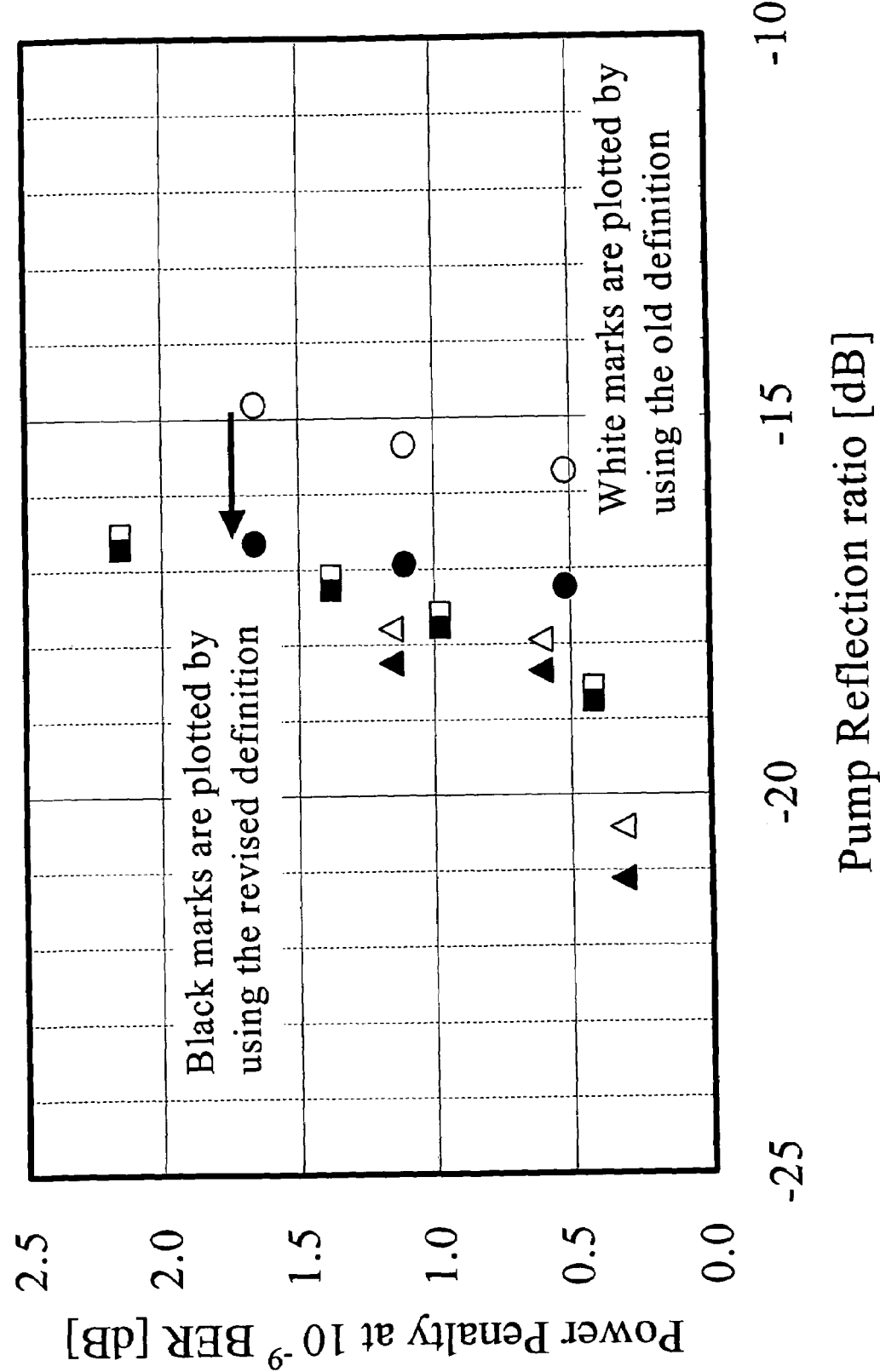
FIG. 8 is a graph showing the power penalty for a predetermined bit error rate versus pump reflection ratio for both a conventional definition (PRR) and a revised definition (WMRR) of peak reflected power ratio.

Using this revised definition, WMRR is compared to the conventional definition PRR, in the graph of FIG. 8. FIG. 8 shows the power penalty at $10^{-9}$ bit error rate versus pump reflection ratio (or WMRR). As seen, the data using WMRR as the metric is much better for predicting power penalty. In this case WMRR for less than (i.e., more negative) –19 dB corresponds to a power penalty of less than 0.5 dB. Furthermore, the data is consistent in that no situation arises where the pump reflection ratio has a lesser associated power penalty, for greater values of pump reflection ratio (as was the case with the conventional measure).

Figure 9:
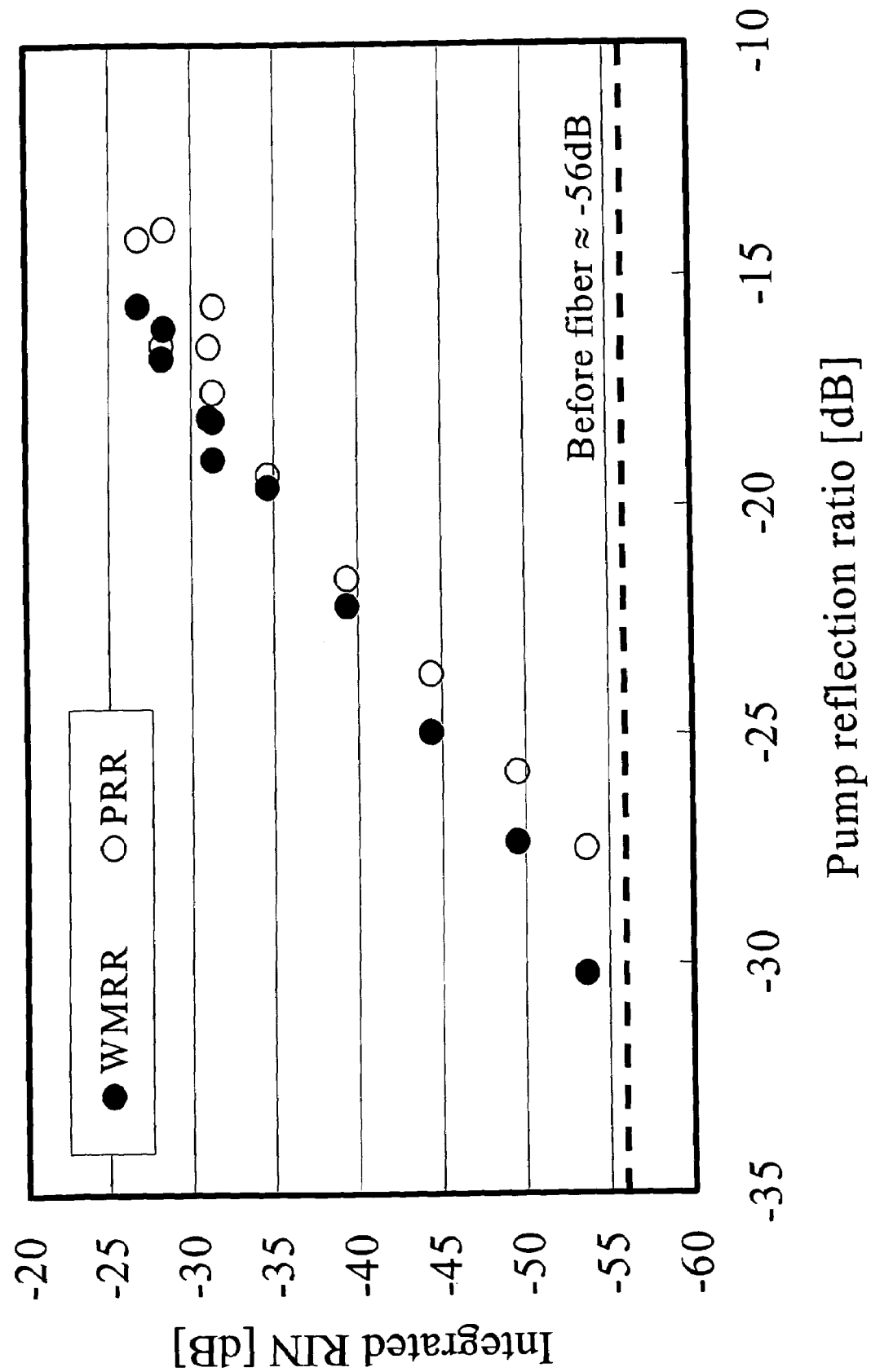
FIG. 9 is a graph showing integrated RIN versus pump reflection ratio for both the new definition WMRR, versus conventional PRR.

FIG. 9 is another graph that compares WMRR and PRR. This graph shows a relationship between integrated RIN and PRR (WMRR). As can be seen, WMRR predicts this relationship better than PRR as is evident by the linear, monotonic and tight clustering (along the line) of the data. Although a larger pump reflection ratio leads to larger RIN, the difference between –16.5 dB and –17 dB is quite small for the WMRR, while the same is not true for PRR. By presenting the data in this way and isolating features of the reflected power, the present inventors were able to recognize that the power ratios between the dominant SBS and the second largest SBS are different among the different operating conditions of the pump lasers. Accordingly, by using the revised definition of WMRR, the additional data may easily be combined with the previous data without fear of inconsistencies, while the conventional technique of PRR does not provide the same assurance.

The reason that the difference of the reflection ratio between the two definitions is larger in the range of the smaller reflection ratio, is that Rayleigh backscattering becomes dominant in the total reflected power and the power of SBS becomes small compared with the total reflected power.

The significance of the results shown in FIGS. 8 and 9 is sizable. The conventional metric for measuring performance (PRR), gives largely scattered data so that if a criteria is set for selecting a pump LD for use in a system based on these plots, many good LDs would be deemed unacceptable, thereby lowering the yield for the pump LDs. On the other hand, using the proposed WMRR approach gives a much smaller scattering and thus gives different results (higher yields). For example, if a power penalty is 2 dB, and PRR is $\leq -17$ dB, it is required from the plots provided in FIG. 8 that all pumps under condition 1 would be deemed as unacceptable for use in the system being not good pumps. On the other hand, if WMRR is used, the criteria for the same power penalty using WMRR is the same ($\leq -17$ dB) but about 66% of the pumps under condition 1 be deemed acceptable samples. Therefore, it should be understood that the present method for characterizing the acceptability of LDs has sizable industrial applicability.

Figure 10:
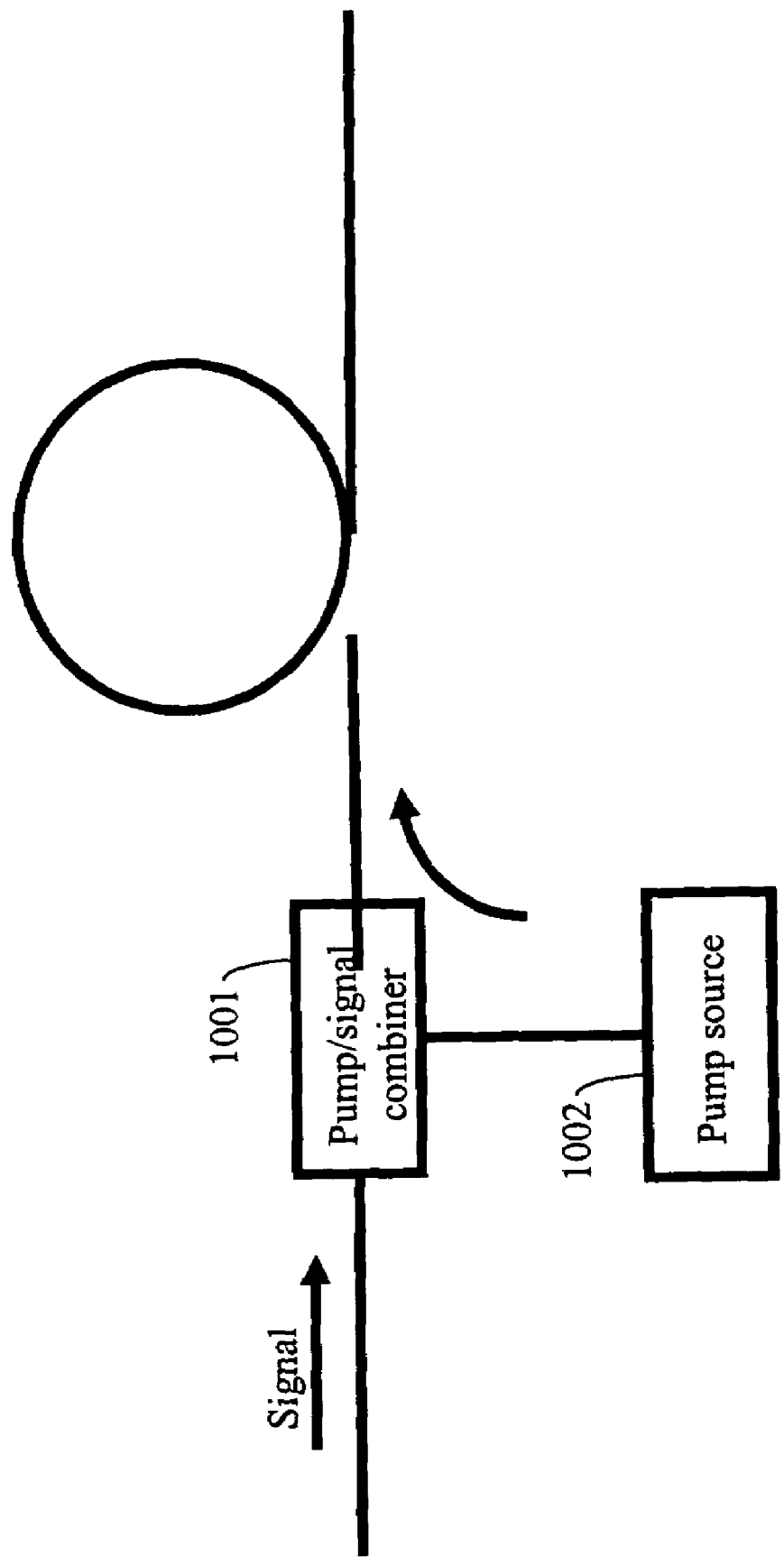
FIG. 10 is a block diagram showing a forward pumped Raman amplifier, with a pump source selected according to the present invention.

FIG. 10 shows a Raman amplifier system, that uses a pump source selected according to the process that will be discussed with regard to FIG. 17. A signal is amplified in a fiber by way of Raman amplification from pump light that is forward pumped from a pump source 102, and combined with a pump/signal combiner 1001. LDs selected for use in the pump are selected to produce less than −21 dB of a pump reflection ratio.

Figure 11:
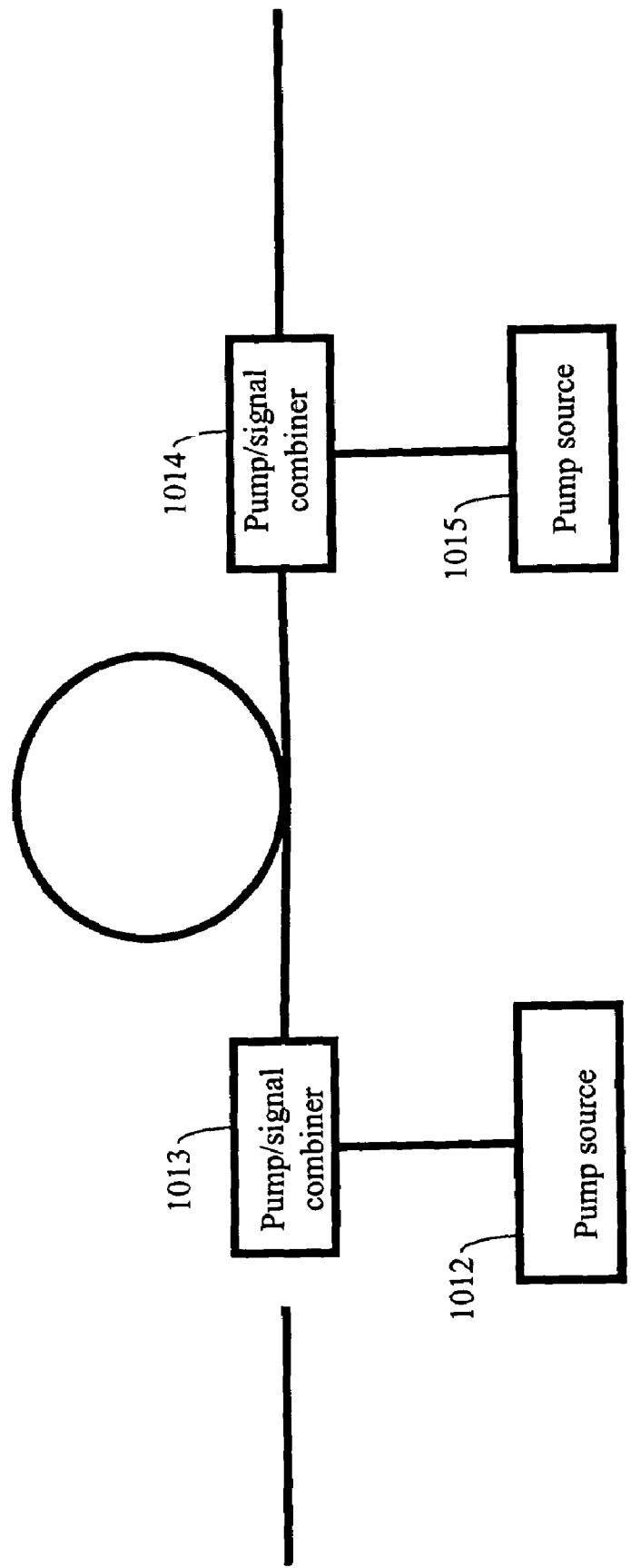
FIG. 11 is a block diagram of another embodiment of the present invention, showing a co-pumped Raman amplifier system, with pump sources selected according to the present invention.

FIG. 11 shows a similar system, although it uses both forward and backward pumping so as to provide a co-pump system. In the system, a forward pump source 1012 provides pump power to a pump/signal combiner 1013 which provides forward pump light to the fiber. The pump source 1012 has been preselected by WMRR evaluation so as to provide suitable performance with suppressed SBS for use in forward pumping. Likewise, a pump source 1015 provides pump light to the fiber by way of a pump signal combiner 1014 for providing backward pump light source. The pump source 1015 does not necessarily need to be selected with the WMRR evaluation because it provides a backward pump operation.

Figure 12:
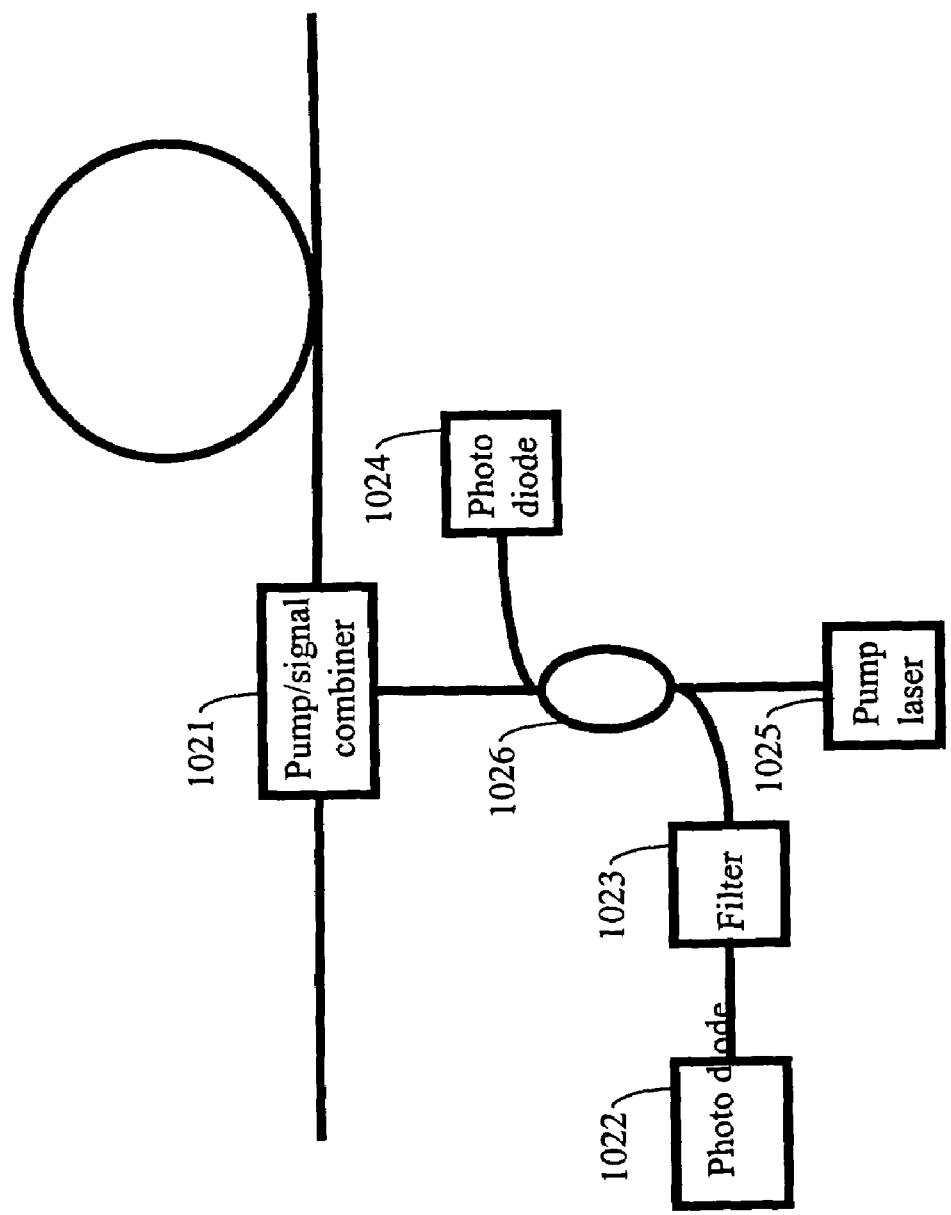
FIG. 12 is a block diagram of another embodiment of the present invention, that uses a monitoring technique for monitoring reflection ratios according to the present invention.

FIG. 12 includes a system that monitors both the pump laser output and the reflected power. Pump laser 1025 provides pump light via a coupler 1026 (e.g., 2% coupler) to a pump signal combiner 1021 which combines the pump light with the signal light for Raman amplifying the signal in the fiber. A portion of the light is detected at photodiode 1024 so that the input power may be measured. Likewise a portion of the reflected pump light is passed through a filter 1023, which is sized to isolate the feature of the dominant SBS so the total power of the SBS dominate peak may be detected at the photodiode 1022. The filter 1023 is set to be centered at the dominant SBS spectral location. This allows the total power of the dominant SBS mode to be monitored by the photodiode 1022. In turn, a comparison between the total power as measured by the photodiode 1024 and the dominant SBS total power as measured by the photodiode 1022 may be compared with one another to identify the WMRR. This comparison may be performed in a processor not shown, or a comparison circuit. Likewise, if used in the field, the continued suitability of the pump laser 1025, may be determined (by the processor) based on the results detected by the respective photodiodes. The filter 1023 may be a tunable filter, which allows the filter to be adjustably centered at the dominant SBS peak.

Figure 13:
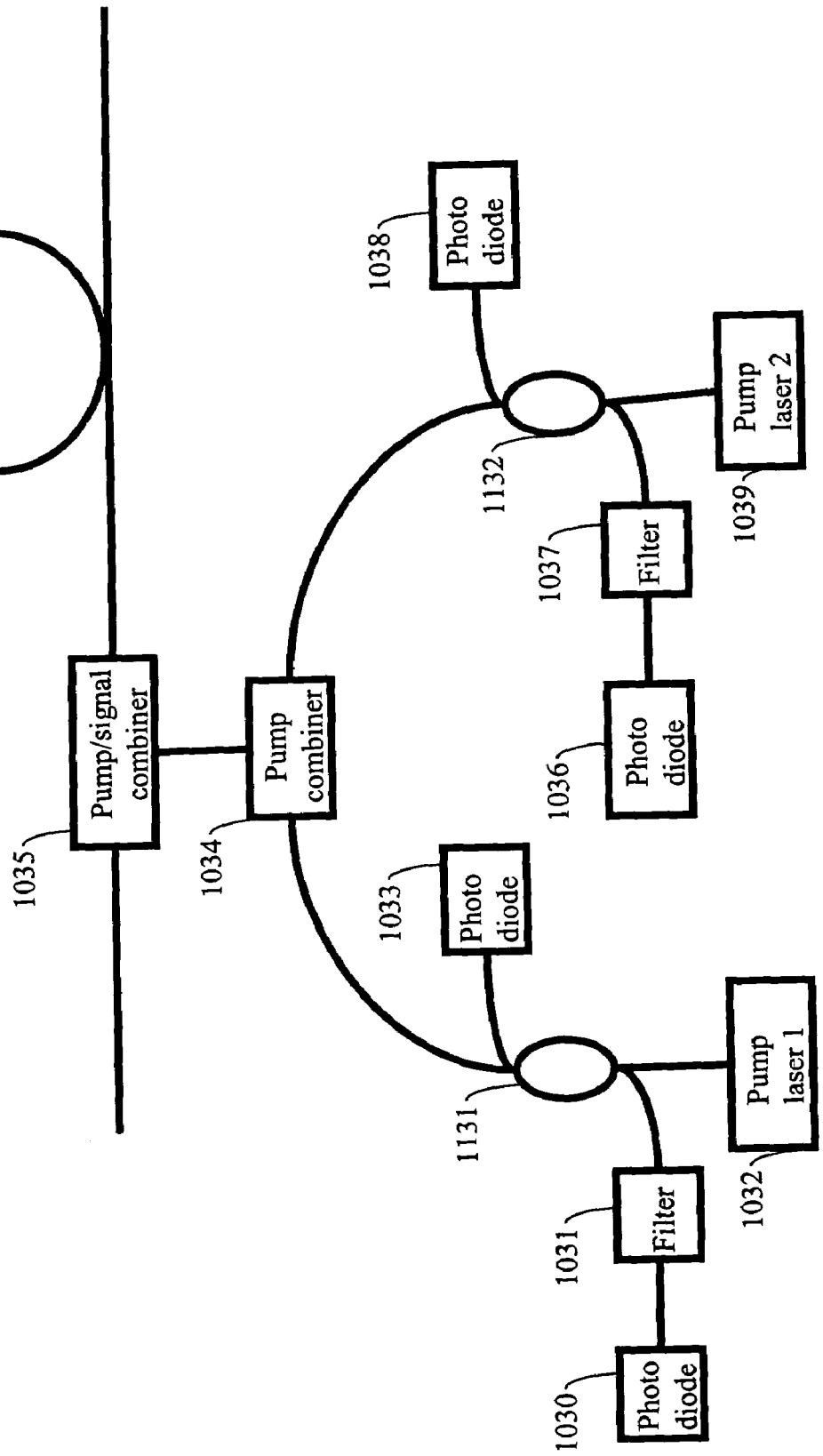
FIG. 13 is a block diagram of a multi-pumped Raman amplifier system, that uses the reflection technique as described in FIG. 12.

FIG. 13 is like FIG. 12, although it shows a multipump configuration. The first pump 1032 provides pumping light to a pump combiner 1034 by way of a coupler 1131. The majority of the pump laser light from the pump laser 1032 is observed by the photodiode 1033 as was the case with FIG. 12. Similarly, a reflected power is observed by the photodiode 1030, after being filtered by filter 1031, which is centered on the dominant SBS mode. The coupler 1131 provides the dual direction coupling for the optical laser light passing therethrough. Similarly, light from the pump laser 2 (element 1039) is passed through the optical coupler 1132 and observed (a fraction thereof) by photodiode 1038. Reflection from the fiber is observed by way of the filter 1037 and detected in photodiode 1036. The laser pump lights are combined by the pump combiner 1034 and then applied to the optical signal in the optical fiber by way of pump/signal combiner 1035. As was the case with FIG. 12, a processor may be used to determine WMRR and compare it against a predetermined threshold.

Figure 14:
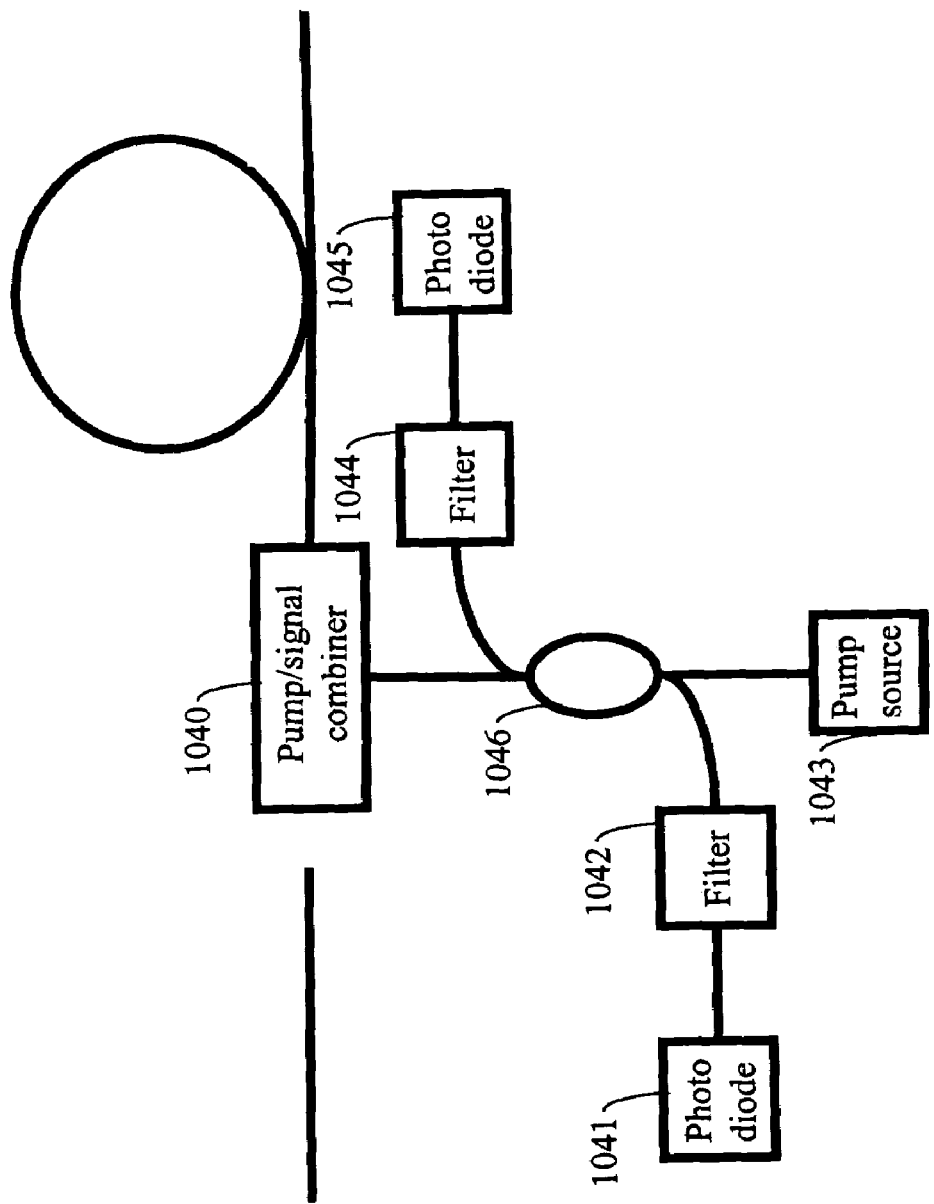
FIG. 14 is like FIG. 12 except includes additional filtering on the monitoring optoelectronics.

FIG. 14 is like that shown in FIG. 12, but an additional tunable filter 1044 is used to provide a filtered input into the photodiode 1045 because the pump source 1043 is assumed to have multiple pump wavelengths. The filter 1044, allows for the selection of a particular wavelength region so as to monitor the total power around one pump wavelength provided by the pump source 1043. Pump source 1043, coupler 1046, filter 1042, photodiode 1041 and pump/signal combiner 1040 performs similar functions as those described in FIG. 12.

Figure 15:
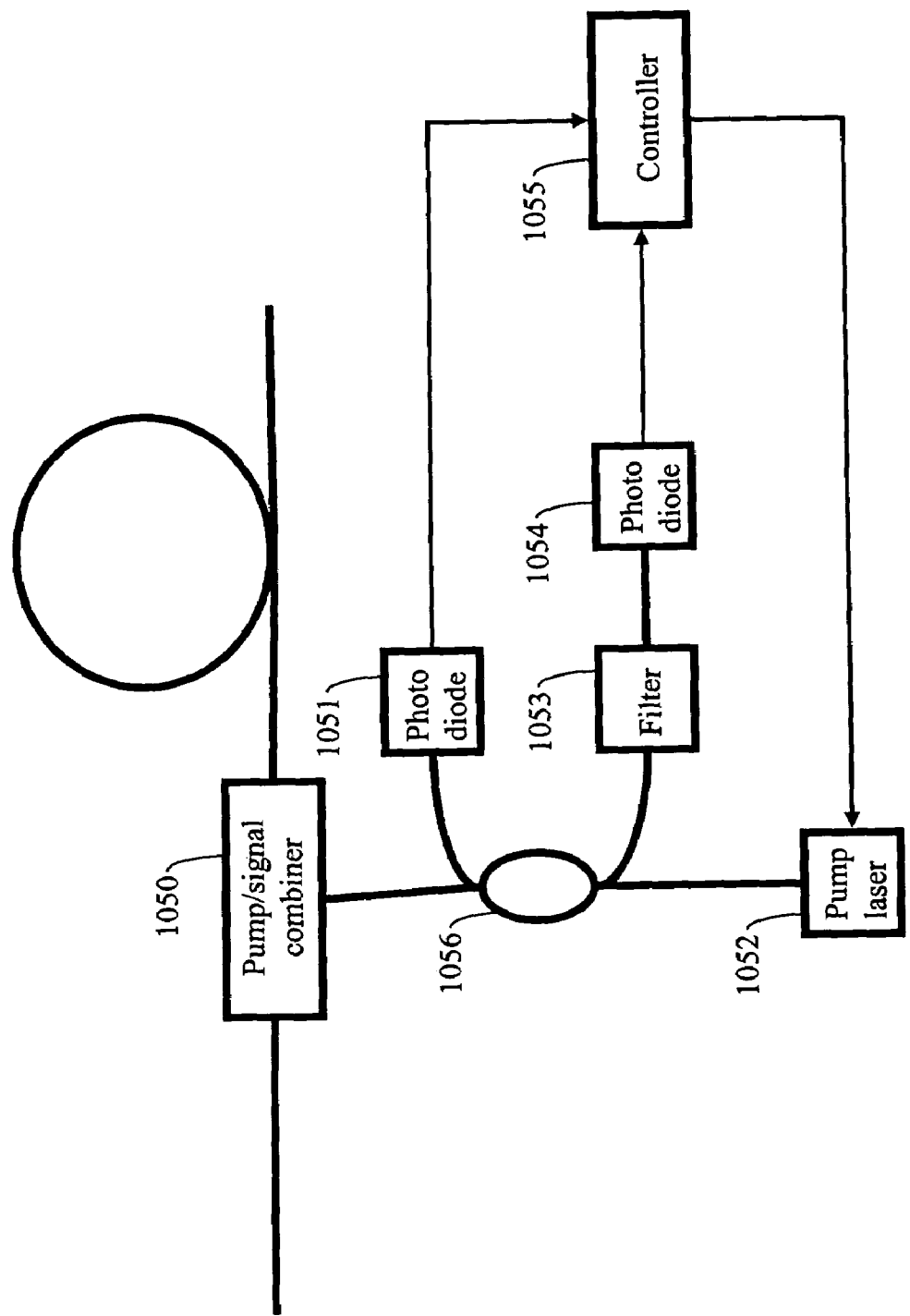
FIG. 15 is a block diagram of a self-controlling Raman amplifier which includes a controller to provide feedback to a laser pump for controlling an output thereof.

FIG. 15 shows an automatic (or in-situ) control system that provides feedback and control of the laser pump 1052. Laser pump 1052 provides pump light to a coupler 1056 which in turn provides the pump light to a pump signal combiner 1050 for amplifying a signal in an optical fiber. A portion of the pump light 1052 is detected by a photodiode 1051 and is provided as a total power input to a controller 1055. A portion of the reflected light is passed through a filter 1053 and detected by photodiode 1054 so as to provide a second input (dominant SBS power) into the controller 1055. The controller 1055 then compares the dominant SBS level to the total power level (determines WMRR) and determines whether the power penalty is above or below a predetermined threshold. If it turns out that the power penalty is above a predetermined threshold, the controller 1055 adjusts the pump laser 1052 to change its output power or laser chip temperature accordingly such that the system operates within the specifications. One way of adjusting the operational temperature of the LD module is to lower the temperature by way of a Peltier module (an active temperature controlling mechanism) that operates under control of the controller 1055.

Figure 16:
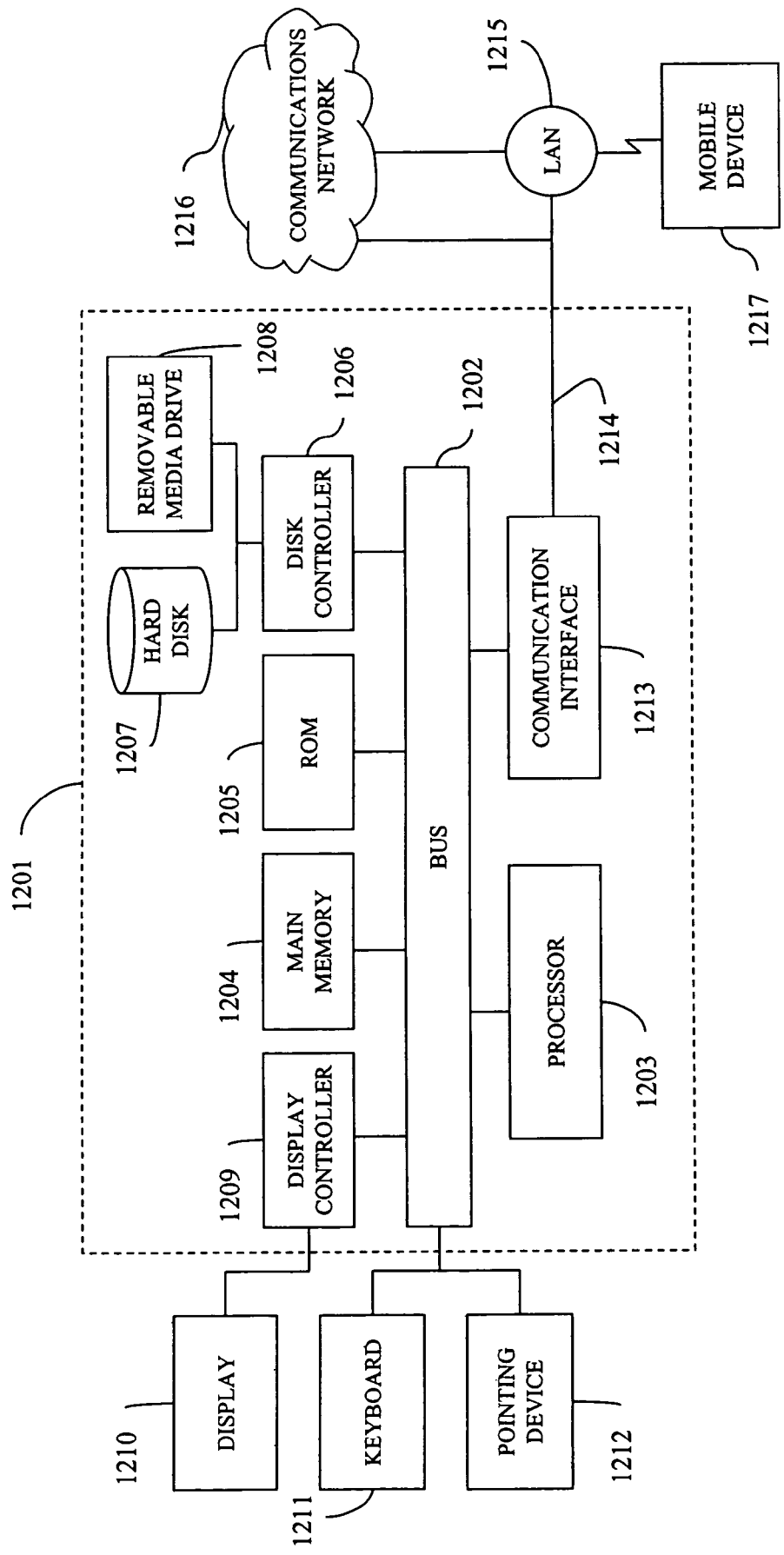
FIG. 16 is a block diagram of a controller according to the present invention.

FIG. 16 illustrates a computer system 1201 upon which an embodiment of the controller for the present invention may be implemented. However, an embedded processor system may be used as well, especially in an embodiment that uses a controller for active monitoring and adjustment of the pump parameters. The illustrated computer system 1201 is best suited for selection of pumps in a manufacturing setting. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables (such as the measured SBS peak levels or total power levels) or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Figure 17:
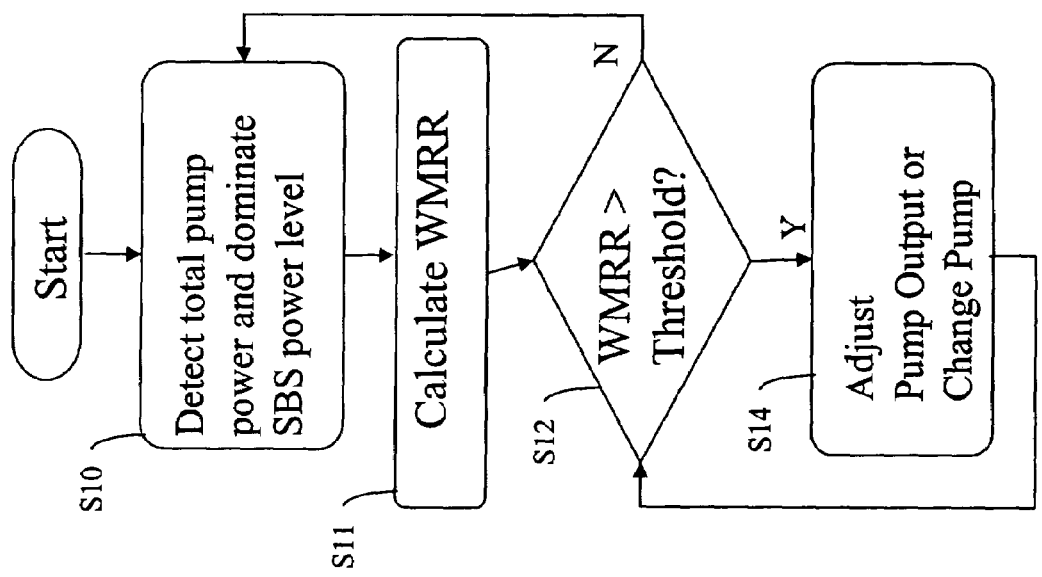
FIG. 17 is a flowchart describing steps according to the method of the present invention.

FIG. 17 is a flowchart describing a process for monitoring WMRR and taking corrective action if WMRR is outside of a predetermined level. The process begins in step S10 where the total pump power is detected and the dominant SBS power level is detected. The process then proceeds to step S11 where WMRR is calculated. Subsequently the process proceeds to step S12 where an inquiry is made regarding whether WMRR is greater than a predetermined threshold. For example, the predetermined threshold could be greater than −19 dB (e.g., −15 dB, which would indicate that the integrated RIN is greater than desired). Thus if the inquiry in step S12 is negative, the process proceeds to S10 where the monitoring process is continued. However, if the inquiry to step S12 is affirmative, the process proceeds to step S14 where the pump operating condition is adjusted to lower the amount of SBS and thus RIN, or a pump selection process, the pump is indicated as being unacceptable and not included in the system. After the adjustment is made in step S14, the process returns to step S12.

Obviously, numerous modifications and variations of the present invention are possible in light of the above teachings. It is therefore to be understood that within the scope of the appended claims, the invention may be practiced otherwise than as specifically described herein.

The invention claimed is:

1. A pump source for a Raman amplifier comprising:
a pump module having a multi-mode semiconductor laser configured to produce a multi-mode pump light having a dominate mode at a predetermined wavelength;
a coupler configured to provide at least a portion of the pump light to a Raman gain medium in a forward pumping direction;
a reflection sensor configured to monitor reflected light that is at least partially reflected from said Raman gain medium, said reflection sensor having a passband characteristic that passes optical power of a dominate SBS peak of said reflected light, but suppresses other SBS peaks that are offset in wavelength from said dominant SBS peak; and
a comparison mechanism configured to compare the optical power of the dominant SBS peak sensed by said reflection sensor to an optical power of the multi-mode pump light and determine whether a comparison result is above a predetermined threshold.

2. The pump source of claim 1, further comprising:
a power monitor configured to monitor the optical power of the multi-mode pump light.

3. The pump source of claim 2, wherein:
said coupler is configured to provide a main portion of said multi-mode pump light to said Raman gain medium and a lesser portion to the power monitor.

4. The pump source of claim 1, wherein:
the comparison mechanism determines a weighted mode reflection ratio, said weighted mode reflection ratio being a ratio of said optical power in said dominate SBS peak to the power level of the multi-mode pump light.

5. The pump source of claim 4, wherein:
the comparison mechanism includes a controller that calculates said weighted mode reflection ratio.

6. The pump source of claim 1, further comprising:
an adjustment mechanism configured to adjust a level of the optical power of said multi-mode pump light so as to reduce the optical power contained in the dominant SBS peak.

7. The pump source of claim 1, further comprising:
a replacement indication mechanism configured to indicate that a level of the optical power contained in said dominant SBS peak is greater than a predetermined level such that the pump module is unsatisfactory for use in the pump source.

8. The pump source of claim 6, wherein:
said adjustment mechanism includes a temperature adjustment mechanism configured to adjust a temperature of said multi-mode semiconductor laser.

9. A method for controlling an amount of stimulated Brillouin scattering (SBS) produced by a Raman amplifier pump so as to regulate a power penalty experienced by a receiver due to the SBS, comprising steps of:
producing with a multi-mode semiconductor laser a multi-mode pump light having a dominate mode at a predetermined wavelength;
coupling at least a portion of the multi-mode pump light to a Raman gain medium in a forward pumping direction;
monitoring with a reflection sensor reflected light that is at least partially reflected from said Raman gain medium, said reflection sensor having a passband characteristic that passes optical power of a dominate SBS peak of said reflected light, but suppresses other SBS peaks that are offset in wavelength from said dominant SBS peak; and
comparing the optical power of the dominant SBS peak to an optical power of the multi-mode pump light, and determining whether a result of the comparing step is above a predetermined threshold.

10. The method of claim 9, further comprising a step of:
monitoring the optical power of the multi-mode pump light.

11. The method of claim 10, wherein:
said coupling step includes providing a main portion of said multi-mode pump light to said Raman gain medium and a lesser portion to a power monitor.

12. The method of claim 9, wherein:
the comparing step includes determining a weighted mode reflection ratio, said weighted mode reflection ratio being a ratio of said optical power in said dominant SBS peak to the power level of the multi-mode pump light.

13. The method of claim 12, wherein:
the comparing step includes calculating said weighted mode reflection ratio.

14. The method of claim 9, further comprising:
adjusting a level of the optical power of said multi-mode pump light so as to reduce the optical power contained in the dominate SBS peak.

15. The method of claim 9, further comprising:
  determining whether a level of the optical power contained in said dominant SBS peak is greater than a predetermined level such that the pump module is unsatisfactory for use in the pump source.

16. The method of claim 14, wherein said adjusting step includes adjusting a temperature of said multi-mode semiconductor laser.

17. A method for selecting laser diode modules for use in a pump source for a Raman amplifier, comprising steps of:
  producing with a multi-mode semiconductor laser a multi-mode pump light having a dominant mode at a predetermined wavelength;
  coupling at least a portion of the multi-mode pump light to a Raman gain medium in a forward pumping direction;
  monitoring reflected light that is at least partially reflected from said Raman gain medium, said monitoring step including monitoring optical power of a dominant SBS peak of said reflected light but not monitoring SBS peaks that are offset in wavelength from said dominant SBS peak;
  determining a weighted mode reflection ratio, said weighted mode reflection ratio being a ratio of the optical power of the dominant SBS peak to an optical power of the multi-mode pump light;
  comparing the weighted mode reflection ratio to a predetermined ratio; and
  rejecting said multi-mode semiconductor laser as being unsatisfactory if the weighted mode reflection ratio is above the predetermined ratio.

18. The method of claim 17, wherein:
  said predetermined ratio is not larger than −19 dB.

19. The method of claim 18, wherein:
  said predetermined ratio is not larger than −20 dB.

20. The method of claim 19, wherein:
  said predetermined ratio is not larger than −21 dB.

21. A pump source for a Raman amplifier comprising:
  means for producing a multi-mode pump light having a dominant mode at a predetermined wavelength;
  means for coupling at least a portion of the multi-mode pump light to a Raman gain medium in a forward pumping direction;
  means for monitoring reflected light that is at least partially reflected from said Raman gain medium, said means for monitoring having a passband characteristic that passes optical power of a dominant SBS peak of said reflected light, but suppresses other SBS peaks that are offset in wavelength from said dominant SBS peak;
  means for comparing the optical power of the dominant SBS peak to an optical power of the multi-mode pump light; and
  means for determining whether a result from the means for comparing is above a predetermined threshold.

22. A Raman amplifier comprising:
  a Raman gain medium configured to amplify an optical signal propagating therethrough when a pump light is applied to the Raman gain medium;
  a coupler configured to pass the pump light to the Raman gain medium; and
  a pump source configured to provide said pump light to the coupler, said pump source including
  a pump module having a multi-mode semiconductor laser configured to produce a multi-mode pump light having a dominant mode in a predetermined wavelength range, said predetermined wavelength range does not include a wavelength of said optical signal, but does cause the optical signal to be amplified,
  a coupler configured to provide at least a portion of the pump light to a Raman gain medium in a forward pumping direction,
  a reflection sensor configured to monitor reflected light that is at least partially reflected from said Raman gain medium, said reflection sensor having a passband characteristic that passes optical power of a dominant SBS peak of said reflected light, but suppresses other SBS peaks that are offset in wavelength from said dominant SBS peak, and
  a comparison mechanism configured to compare the optical power of the dominant SBS peak sensed by said reflection sensor to an optical power of the multi-mode pump light and determine whether a comparison result is above a predetermined threshold.

* * * * *